(12) United States Patent
Xu et al.

(10) Patent No.: US 7,809,094 B2
(45) Date of Patent: Oct. 5, 2010

(54) METHOD AND APPARATUS FOR PROVIDING CANCELLATION OF HARMONICS SIGNALS WITH MODULATED SIGNALS FOR MULTI-CHANNELS

(75) Inventors: Junyi Xu, Fremont, CA (US); Binfan Liu, Livermore, CA (US); Vladimir Radionov, San Ramon, CA (US); Weimin Zhang, San Jose, CA (US)

(73) Assignee: BroadLogic Network Technologies Inc., San Jose, CA (US)

( * ) Notice: Subject to any disclaimer, the term of this patent is extended or adjusted under 35 U.S.C. 154(b) by 520 days.

(21) Appl. No.: 11/872,667

(22) Filed: Oct. 15, 2007

(65) Prior Publication Data

US 2009/0096514 A1 Apr. 16, 2009

(51) Int. Cl.
*H03D 1/04* (2006.01)
(52) U.S. Cl. ...................................... 375/346
(58) Field of Classification Search .................. 375/346, 375/350
See application file for complete search history.

(56) References Cited

U.S. PATENT DOCUMENTS 7,103,342 B2 * 9/2006 Kusbel et al. ............... 455/296
7,366,088 B2 * 4/2008 Bolinth et al. .............. 370/203
2005/0175132 A1 * 8/2005 Yang .......................... 375/350
2005/0276363 A1 * 12/2005 Joublin et al. ............... 375/350

* cited by examiner

*Primary Examiner*—Kevin Y Kim
(74) *Attorney, Agent, or Firm*—Townsend and Townsend and Crew LLP

(57) ABSTRACT

A device and method for canceling or attenuating harmonics noise without distorting the incoming signal. An exemplary device includes the use of an estimation loop to generate an artificial signal to eliminate or attenuate the influence of harmonics. The estimation loop includes a mixer adapted to produce a mixed signal by processing or combining the incoming signal and the artificial signal. The estimation loop includes an error detector, a low-pass filter, a parameter estimator, and a numerically controlled oscillator. The parameter estimator produces information relating to the phase, frequency, and amplitude of an incoming harmonics spur and will be used by the numerically controlled oscillator to generate the artificial signal. If the mixed signal contains relatively low levels of harmonics residuals, the mixed signal is produced at the output in lieu of the incoming signal.

25 Claims, 11 Drawing Sheets

METHOD AND APPARATUS FOR PROVIDING CANCELLATION OF HARMONICS SIGNALS WITH MODULATED SIGNALS FOR MULTI-CHANNELS

BACKGROUND OF THE INVENTION

The present invention generally relates to harmonics cancellation, and more specifically, to a method and system for canceling harmonics noise. In general, according to an embodiment, the invention can be applied to attenuating harmonics noise coupled with electronic signals, irrespective of whether the noise arise from known or unknown sources, whether the noise signal is subject to drift, whether the noise is modulated in its amplitude, frequency, and phase, and whether the noise is intermittent or continuous.

A common source of electronic noise in digital systems is the running digital clock. Since there is a running clock in almost every digital system, non-linear effects of such sources can cause clock harmonics (also known as spurs) to be coupled with useful signals. Although electrical isolation methods can suppress such harmonics, they do not guarantee successful operations in all cases. For example, where the input signal may be coupled with harmonics during a signal transmission, a user at the receiving end may not have control over the signal transmission end to create an effective electrical isolation at the source of the noise. Even if the user had control over the signal transmission apparatus, in many cases, due to tight system integration, the harmonics are nevertheless difficult or impossible to isolate.

Another conventional method to suppress clock harmonics is based on detecting harmonics noise during periods where normal useful signals may be absent. One drawback with this type of approach is that not all systems or use cases guarantee there to be periodic windows of time where useful signals are absent. Further, since harmonics noise can be modulated and subject to drift, the determination of the characteristics of the noise during windows when normal useful signals are absent does not necessarily predict the characteristics of the noise during windows when normal useful signals are not absent.

Another conventional method is based on notching out signal energy around the spur frequency. This approach however can introduce unacceptable signal loss in the resulting signals, leading to unacceptable signal-to-noise ratio, for example.

In general, a spur may be located in any baseband frequency, and its frequency, phase, and amplitude can be modulated in unexpected ways. A spur may in general arise from known or unknown sources. A spur may be continuous or intermittent. Harmonics noise in general degrades signal transmission and decreases overall system performance of digital communications systems.

BRIEF SUMMARY OF THE INVENTION

According to an aspect of the present invention, a method and system for canceling or attenuating a harmonics signal operate by adding an artificial signal into the incoming signal. In general, according to embodiments, a priori knowledge of the harmonics noise, such as its frequency, phase, and amplitude, is not required. The frequency of the spur may thus be subject to drift and the amplitude subject to modulations. A priori knowledge of the source of the harmonics noise is also not required. These embodiments of the invention are not limited to an incoming that is continuous or limited to an incoming that is intermittent.

According to an embodiment, the method includes using an estimation loop to determine parameters of an artificial signal, which is used to attenuate an incoming harmonics spur. The method includes steps for detecting harmonics residuals in a mixed signal (i.e., assessing global errors between the artificial signal and the harmonics spur noise), filtering the error signal, adapting signal parameters, and generating a new artificial signal for a next sample of the incoming signal. The estimation parameters include information such as the amplitude, frequency, and phase relating to an incoming harmonics spur.

According to another embodiment, a system to attenuate a harmonics spur may include an estimation loop component. The estimation loop is adapted to derive parameter estimations for an artificial signal based on an estimation of the amplitude, frequency, and phase characteristics of an incoming spur. The estimation loop includes an error detector, a narrow-band low-pass filter, a parameter adjustment estimator, and a numerically controlled oscillator. According to a specific embodiment, the low-pass filter can be multiplier-free. The numerically controlled oscillator is adapted to create an artificial signal controlled by the estimated parameters. When mixed with the incoming signal, the artificial signal preferably attenuates a harmonics spur in the signal.

According to the embodiment, the numerically controlled oscillator is adapted to create the artificial signal controlled by the estimated parameters that the parameter estimator produces. When an artificial signal produced is close enough to an actual spur in the incoming signal, the artificial signal will effectively attenuate the spur in the incoming signal without affecting or distorting the original signal.

According to another embodiment, an estimation process or loop is adapted to switch between two working modes, an acquisition mode and tracking mode, based on how closely the artificial signal matches a harmonics spur in the incoming signal. When an estimation loop has generated an artificial signal capable of effectively canceling an incoming spur, the loop enters into or continues to operate in tracking mode. The incoming signal is mixed with the artificial signal and presented at the output. Otherwise, the loop operates in acquisition mode and continues to track an incoming harmonics spur in an attempt to lock onto one incoming spur. Depending on the specific embodiment, the system may present either the incoming signal or no signal at all at the output when the system is in acquisition mode.

According to another embodiment, a method and system include sharing a harmonics canceller among multiple channels of signals to cancel or attenuate harmonics spurs in multiple channels of signals. The method and system include storing each channel of incoming signals in buffers and obtaining each sample of signals for a channel from the buffers. The method and system also include storing various states of the harmonics canceller before switching to another channel and later restoring the state of the harmonics canceller based on the stored information when processing the same channel again.

According to another embodiment, a method and system operate to cancel or attenuate multiple harmonics spurs in an incoming signal. The method and system include cascading two or more harmonics cancellers in such a way for one of the harmonics cancellers to "lock in" and attenuate a first harmonics spur and for another of the harmonics cancellers to "lock in" and attenuate a second harmonics spur.

The invention can be used for a number of applications involving digital system involving signal processing. For example, the invention can be used in television equipments, cable modems, RF transceivers, imagine systems, among others.

Other features and advantages of the present invention, as well as the structure and operation of various embodiments of the present invention, are described below. Still other aspects of the invention will be obvious from the description set herein or may be learned by practice of the invention. The detailed description of the present invention refers to the drawings and illustrations set forth below.

DETAILED DESCRIPTION OF THE INVENTION

The present invention generally relates to a method and system for conducting harmonics cancellation. More specifically, the invention relates to a system and method for canceling harmonics noise in a digital electronic system. The term harmonics cancellation is used synonymously with the cancellation of any of several types of noise in an electronic system, including clock harmonics spurs, and unwanted continuous wave signals. In general, an incoming signal may contain one or a plurality of harmonics spurs. The duration of a harmonics spur may be intermittent or continuous and can arise from a known or an unknown source. The characteristics of a harmonics spur such as its phase, frequency, and amplitude in general may or may not be known a priori. According to an aspect of the invention, one or multiple harmonics spurs in a signal may be removed. The method and system may be used to remove harmonics spurs in one channel of signals or multiple channels of signals.

Figure 1A:
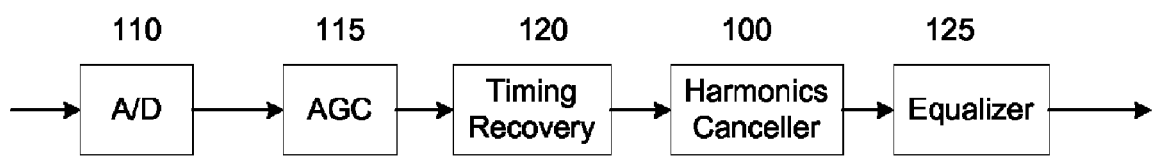
FIGS. 1A and 1B show two exemplary contexts where a harmonics canceller can be implemented in a digital electronic system.

FIG. 1A shows an exemplary context where a harmonics canceller 100 can be used. Harmonics canceller 100 may be placed in one of several locations in a digital electronic system. According to this embodiment, harmonics canceller 100 is used in a digital communications system 105 to reduce clock harmonics interference in an incoming communication signal. In the embodiment, an incoming signal passes through an analog to digital converter system 110, an automatic gain control system 115, a timing recovery component 120 before it encounters the harmonics canceller 100. After the harmonics canceller, the signal finally passes through an equalizer system 125. The signal that ultimately leaves the system preferably is a signal with the clock harmonics interference removed.

Figure 1B:
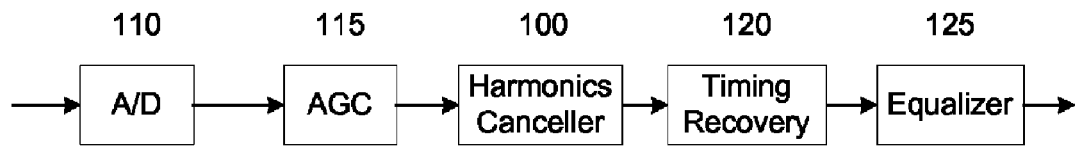

FIG. 1B shows another exemplary context where a harmonics canceller is used in a digital communications system 130. In this embodiment, an incoming signal passes through an analog to digital converter system 110 and an automatic gain control system 115 before it encounters the harmonics canceller 100. After the harmonics canceller, the signal passes through a timing recovery component 120 and an equalizer system 125. The signal that ultimately leaves the system preferably is a signal with the clock harmonics interference removed.

Figure 2:
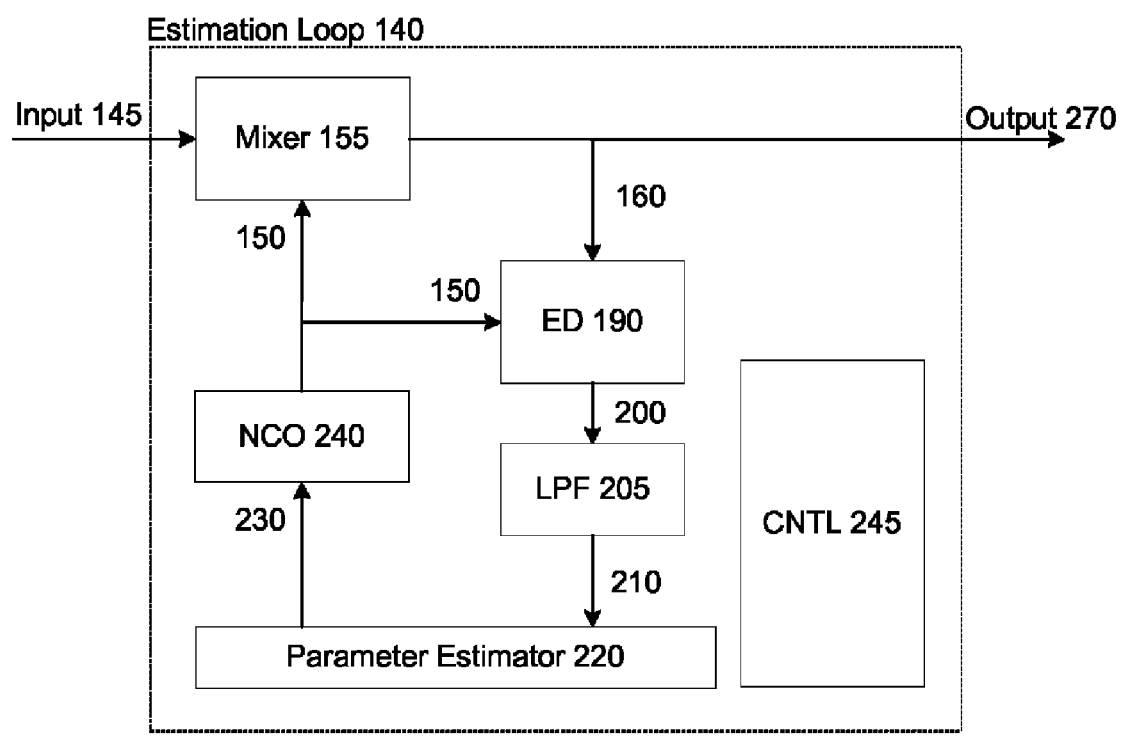
FIG. 2 shows an exemplary embodiment of a harmonics canceller estimation loop according to an aspect of the current invention.

FIG. 2 shows an exemplary embodiment of an estimation loop 140 that forms a component of harmonics canceller 100. The harmonics estimation loop 140 is adapted to attenuate a harmonics spur in an incoming signal 145 by detecting the harmonics spur and generating an artificial signal 150 for canceling out the harmonics spur. As shown in the figure, the estimation loop 140 includes a mixer 155 adapted to produce mixed signal 160 by processing or combining input signal 145 and artificial signal 150. A desired operation is that mixed signal 160 will have a harmonics spur in incoming signal 145 removed. Estimation loop 140 also includes an error detector 190 adapted to produce an error signal 200 by processing and comparing mixed signal 160 and artificial signal 150. The loop includes a low-pass filter 205 adapted to increase the spur-to-noise ratio.

Estimation loop 140 further includes a parameter estimator 220 adapted to produce a parameter estimation signal 230 containing information relating to a harmonics spur by processing filtered error signal 210. According to an embodiment, the parameter information includes information relating to the phase, frequency, and amplitude parameters of a harmonics spur and is used to create artificial signal 150. The loop includes a numerically controlled oscillator 240, controlled in part by a parameter estimation signal 230 for generating artificial signal 150. Estimation loop 140 also includes a control unit 245 adapted to coordinate and manage the execution of various components of the estimation loop.

Figure 3A:
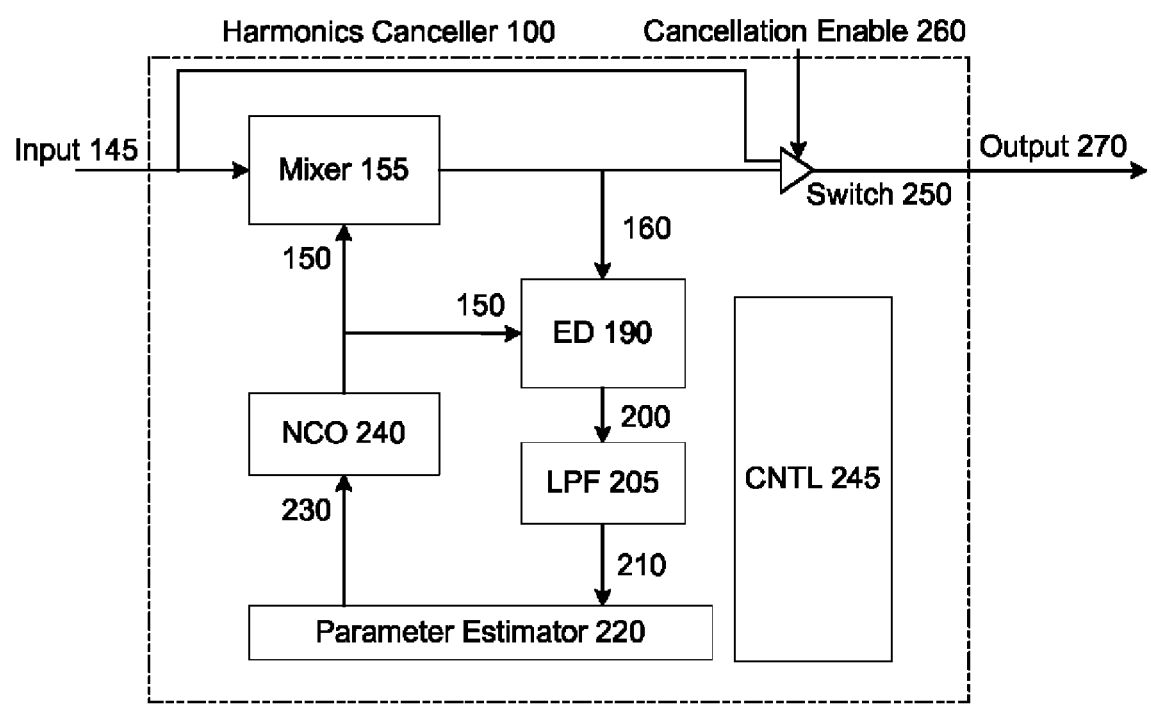
FIG. 3A shows an embodiment of a harmonics canceller comprising an exemplary estimation loop shown in FIG. 2.

FIG. 3A shows an embodiment of harmonics canceller 100 including an exemplary estimation loop shown in FIG. 2. In addition to the estimation loop, the harmonics canceller includes an output switch 250 controlled by a cancellation enable signal 260. According to an embodiment, if mixed signal 160 is relatively spur free, harmonics canceller 100 enters a tracking mode. A cancellation enable signal 260 is sent to output switch 250. In response, output switch 250 presents mixed signal 160 at an output terminal 270. According to another embodiment, if mixed signal 160 still contains significant spur residues, the canceller stays in an acquisition mode. No cancellation enable signal 260 is sent. Depending on the specific embodiment, output switch 250 may present either original input signal 145 or no signal at all at output 270.

Figure 3B:
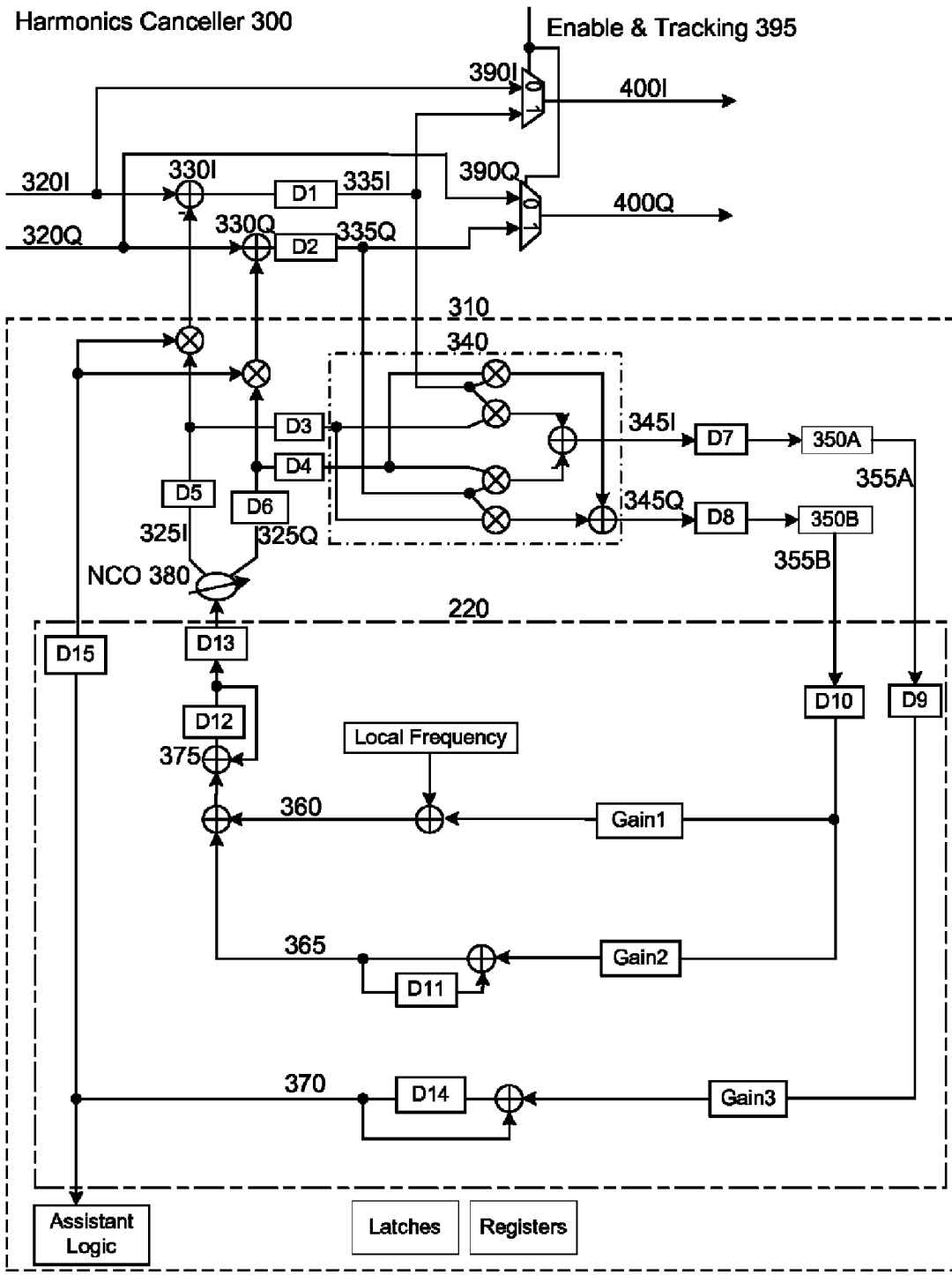
FIG. 3B shows an implementation of a harmonics canceller comprising an estimation loop according to another aspect of the current invention.

FIG. 3B shows a specific implementation of a harmonics canceller 300 comprising an estimation loop 310. Harmonics canceller 300 is adapted to detect a harmonics spur in incoming signals 320I and 320Q and to produce output signals 400I and 400Q where the detected harmonics spur are preferably removed. Signals with a suffix of I denote in-phase components of the signals while signals with a suffix of Q denote quadrature components of the signals. Similarly, components with a suffix of I denote components adapted to process in-phase components of the signals while components with a suffix of Q denote components adapted to process quadrature components of the signals.

Mixers 330I and 330Q are adapted to process or combine incoming signals 320I and 320Q with artificial signals 325I and 325Q to produce mixed signals 335I and 335Q. An error detector 340 is adapted to process mixed signals 335I and 335Q and artificial signals 325I and 325Q to produce error signals 345I and 345Q. Low-pass filters 350A and 350B are adapted to process error signals 345I and 345Q to produce error signals 355A and 355B.

Parameter estimator 220 is adapted to process error signals 355A and 355B to produce parameter estimation signals 360, 365, 370, and 375 for producing artificial signals 325I and 325Q. Numerically controlled oscillator 380 is adapted to generate artificial signals 325I and 325Q based on parameter estimation signal 375. Control unit 245 is adapted to coordinate and manage the execution of various components of estimation loop 310.

In addition to estimation loop 310, harmonics canceller 300 includes output switches 390I and 390Q. According to an embodiment, if mixed signals 335I and 335Q are relatively spur free, harmonics canceller 300 enters tracking mode. Cancellation enable signal 395 is sent. Output switches 390I and 390Q are adapted present mixed signals 335I and 335Q at output terminals 400I and 400Q. According to another embodiment, if mixed signals 335I and 335Q contain significant spur residues, harmonics canceller 300 stays in acquisition mode. No cancellation enable signal 395 is sent. Depending on the specific embodiment, output switches 390I and 390Q may present either original input signals 320I and 320Q or no signal at all at output terminals 400I and 400Q.

Throughout the signal loop of the implementation are distributed a multiplicity of registers and latches. The registers and latches are labeled with a prefix of "D." The registers and latches operate to specify the proper functions of various components of the circuit. The registers and latches also enable various states of harmonics canceller 300 to be saved and later restored.

Figure 4A:
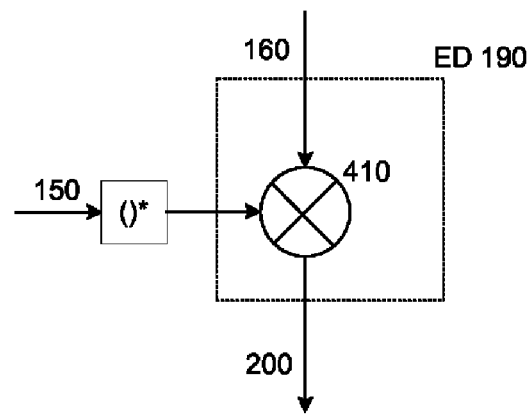
FIG. 4A shows an implementation of an error detector using conjugate multiplication for use in a harmonics estimation loop.

FIG. 4A shows an implementation of error detector 190 for use in a harmonics estimation loop such as that shown in FIG. 2 and FIG. 3A. According to an embodiment, the error detector may comprise a complex multiplier 410 adapted to produce error signal 200 by combining mixed signal 160 and conjugate of artificial signal 150. According to the embodiment with the multiplier, error signal 200 can be denoted as $yxe^{-j\Phi_{NCO}}$ where y denotes mixed signal 160 and $\Phi_{NCO}$ denotes the phase of artificial signal 150.

Figure 4B:
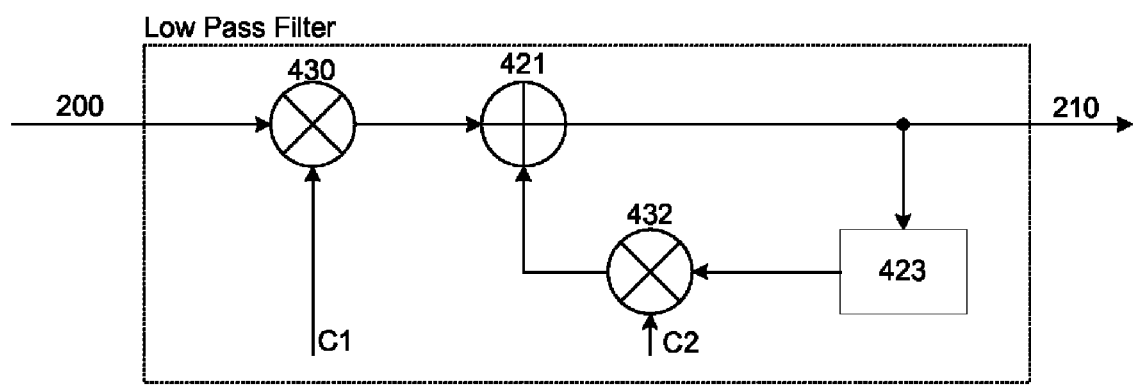
FIG. 4B shows another implementation of a low-pass filter comprising an adder, two multipliers, and a latch for use in a harmonics estimation loop.

FIG. 4B shows an implementation of low-pass filter 205 for use in a harmonics estimation loop. According to this embodiment, the low-pass filter includes an adder 421, two multipliers 430 and 432, and a latch 423, as shown in FIG. 4B. In the embodiment, multiplier 430 is adapted to multiply signal 200 by $C_1$, multiplier 432 is adapted to multiply signal 210 along the feedback path by $C_2$, and latch 423 is adapted to store a sample of signal 210.

Figure 4C:
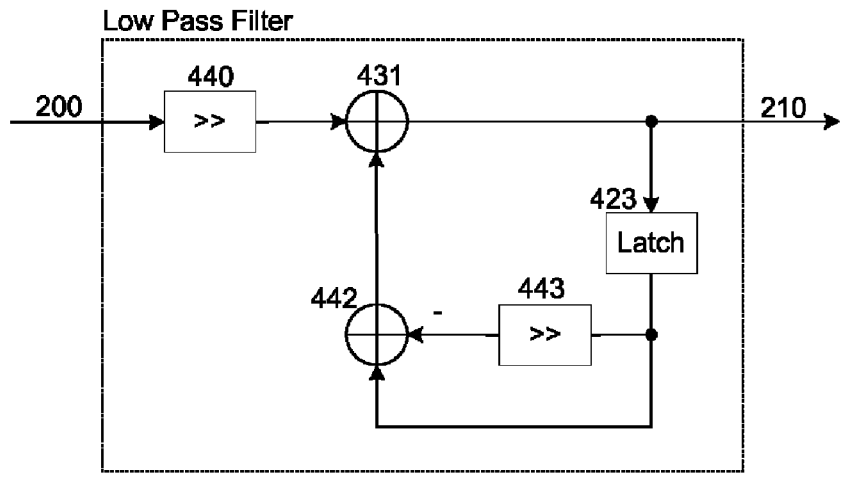
FIG. 4C shows another implementation of a low-pass filter comprising two shifters, two adders, and a latch for use in a harmonics estimation loop.

FIG. 4C shows another implementation of low-pass filter 205 for use in a harmonics estimation loop. According to the embodiment, the low-pass filter can also comprise two shifters 440 and 443, two adders 431 and 442, and a latch 423, as shown in FIG. 4C. In the embodiment, shifter 440 is adapted to process signal 200, combination of shifter 443 and adder 442 are adapted to process signal 210 along the feedback path, and latch 423 is adapted to store a sample of signal 210.

Figure 4D:
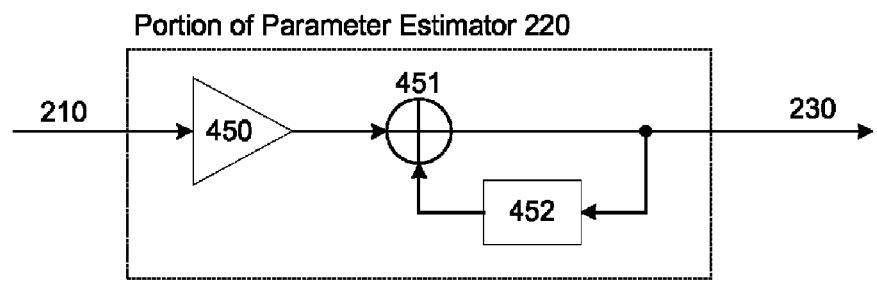
FIG. 4D shows an implementation of a portion of a parameter estimator adapted to produce an estimated amplitude for an artificial signal.

FIG. 4D shows an implementation of a portion of parameter estimator 220 adapted to produce amplitude information used to produce artificial signal 150. According to this embodiment, the portion includes a gain amplifier 450, an adder 451, and a latch 452 adapted to store the estimated amplitude for an artificial signal 150.

Figure 4E:
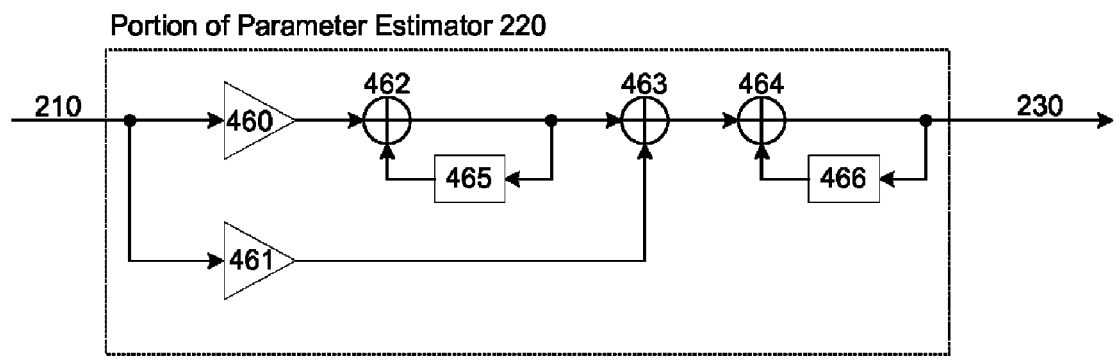
FIG. 4E shows an implementation of a portion of a parameter estimator adapted to produce an estimated phase and frequency for an artificial signal.

FIG. 4E shows an implementation of a portion of parameter estimator 220 adapted to produce the frequency and phase information used to produce artificial signal 150. According to this embodiment, the portion includes two amplifiers 460 and 461, three adders 462, 463, and 464, and two latches 465 and 466, with latch 465 adapted to store the estimated frequency and latch 466 adapted to store the estimated phase.

Figure 5A:
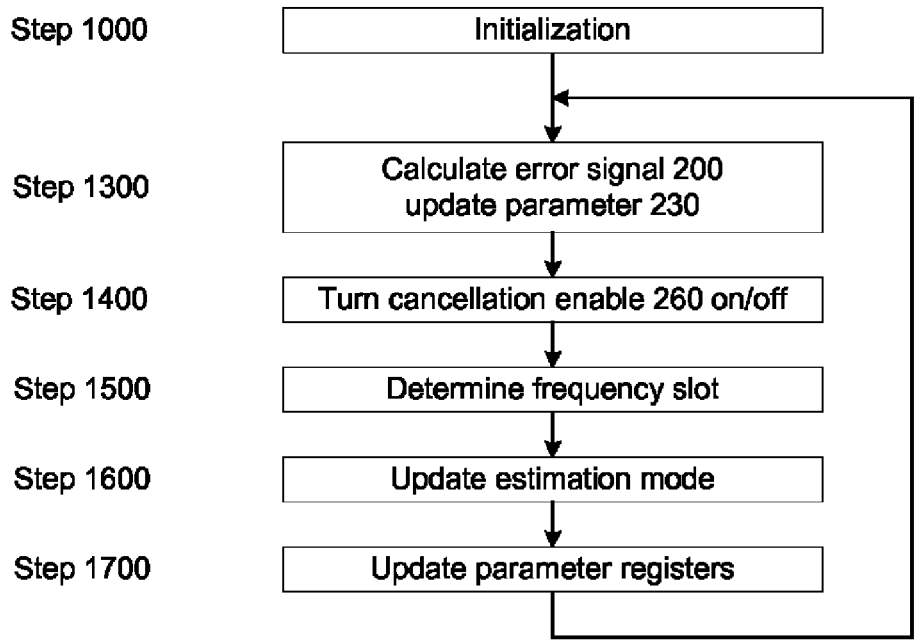
FIG. 5A is a flowchart depicting an exemplary method for canceling a harmonics spur using a harmonics canceller.

FIG. 5A is a flowchart depicting an exemplary method for canceling a harmonics spur using a harmonics canceller such as harmonics canceller 100 described above. In step 1000, various components of a harmonics canceller 100, including the parameter estimator 220, are initialized or reset. In step 1300, a sample of input signal 145 is obtained. For each sample of input signal 145, an error signal 210 is calculated and an artificial signal 150 is produced. Artificial signal estimation can be performed either at the symbol frequency $f_S$ or at a down-sampled symbol frequency $f_S/N$.

Step 1400 involves deciding whether to go into tracking mode or acquisition mode. According to one embodiment, following FIG. 3A, if a harmonics spur in the input signal 145 has been reduced sufficiently in the mixed signal 160, a cancellation enable signal is sent to the output switch 250. Output switch 250 produces mixed signal 160 at output 270. If significant spur residuals still exist, a cancellation enable signal is not sent. Output switch 250 either presents no signal at output 270 or presents input signal 145 at output 270, depending on the specific embodiment.

Step 1500 involves determining a frequency range (i.e., "slot") within which a harmonics spur is sought. According to an embodiment, measurement is carried out first for an initial frequency slot. If no harmonics spur is found in the initial frequency slot in a predetermined period, the canceller is adapted to move onto a next slot. The next frequency slot may or may not be adjacent to the current frequency slot. If no harmonics spur is found again, a still next slot is selected for processing. The process is repeated until a frequency slot containing a harmonics spur is located.

Step 1600 involves specifying a mode of operation—acquisition mode or tracking mode—for a harmonics canceller. According to an embodiment, the determination is based on evaluating the estimation parameters obtained. For example, if the amplitude estimation for an artificial signal reaches and stabilizes at a definite and non-zero value after a predetermined samples of an input signal have been assessed, one may ascertain that a harmonics spur does exist in the input signal within the frequency slot. The harmonics canceller then specifies tracking mode. If, however, the amplitude estimation for an artificial signal fails to reach a definite and non-zero value or fails to stabilize after assessments of another predetermined samples of an input signal, the harmonics canceller specifies acquisition mode.

Step 1700 involves updating parameter registers based on the calculations carried out in the above steps. According to an embodiment, the various states associated with a harmonics canceller may be stored to state registers. According to a specific embodiment, a harmonics canceller contains various registers and latches along various signal paths. The values stored in these registers and latches may all be stored to an external state memory so these registers and latches can be reinitialized with these values at a later time.

Figure 5B:
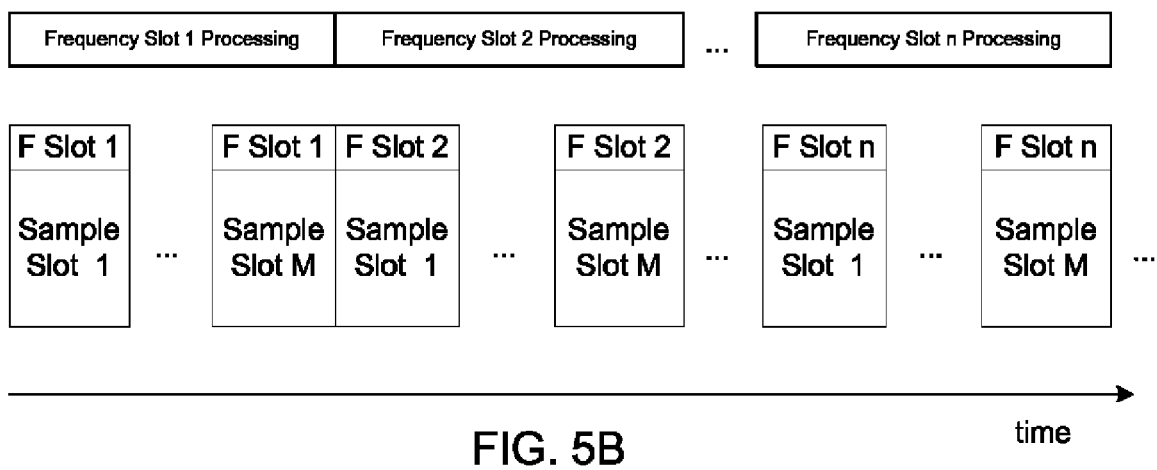
FIG. 5B shows an exemplary procedure for sampling incoming signals to determine whether a frequency slot contains a harmonics spur.

FIG. 5B shows an exemplary procedure for sampling incoming signals to determine whether a frequency slot contains a harmonics spur.

According to an embodiment, the process begins when a first frequency slot is selected. Based on the first frequency slot, a predetermined number of sample slots, M, can be processed, each sample slot including, according to an embodiment, approximately 10 samples. A predetermined number of sample slots, M, may be processed for a frequency slot before moving on to a next slot if there is no harmonics spur found.

For each of the series of sample slots, a set of parameter estimators for signal 230 is obtained. By measuring the parameter estimators through predetermined number of sample slots, the harmonics canceller may determine whether the current frequency slot includes a harmonics spur. For example, if the amplitude estimation for an artificial signal reaches and stabilizes at a definite and non-zero value after a predetermined number of sample slots of an input signal have been assessed, one may ascertain that the frequency slot does include a harmonics spur. If, however, the amplitude estimation for an artificial signal fails to reach a definite and non-zero value or fails to stabilize after assessments of a predetermined number of sample slots of an input signal, one may ascertain that the frequency slot does not include any harmonics spur.

If no harmonics spur is found for a frequency slot after processing a predetermined number of sample slots, the harmonics canceller may select a next frequency slot to process. According to an embodiment, the predetermined number is about 100,000. According to another embodiment, the next frequency slot may or may not relate to an adjacent spectrum to the current frequency slot. For example, in embodiments where frequency slots are scanned, the next frequency slot may simply be an adjacent range of frequency bands. The next frequency slot may be selected randomly from the frequency slots that have not been processed yet. In still other embodiments, the next frequency slot may be selected from the frequency slots that have not been processed yet with the highest probability of containing a harmonics spur. The probability may be determined from a priori knowledge of the digital environment in which a system operates. For example, the frequency slot containing the clock frequency of the local oscillator may be designated a frequency slot likely to contain a harmonics spur. The procedure may be repeated for the next frequency slot and so on, until a frequency slot with a harmonics spur is found. The procedure may repeat until the entire frequency spectrum has been scanned and found to contain no harmonics spur.

Figure 6A:
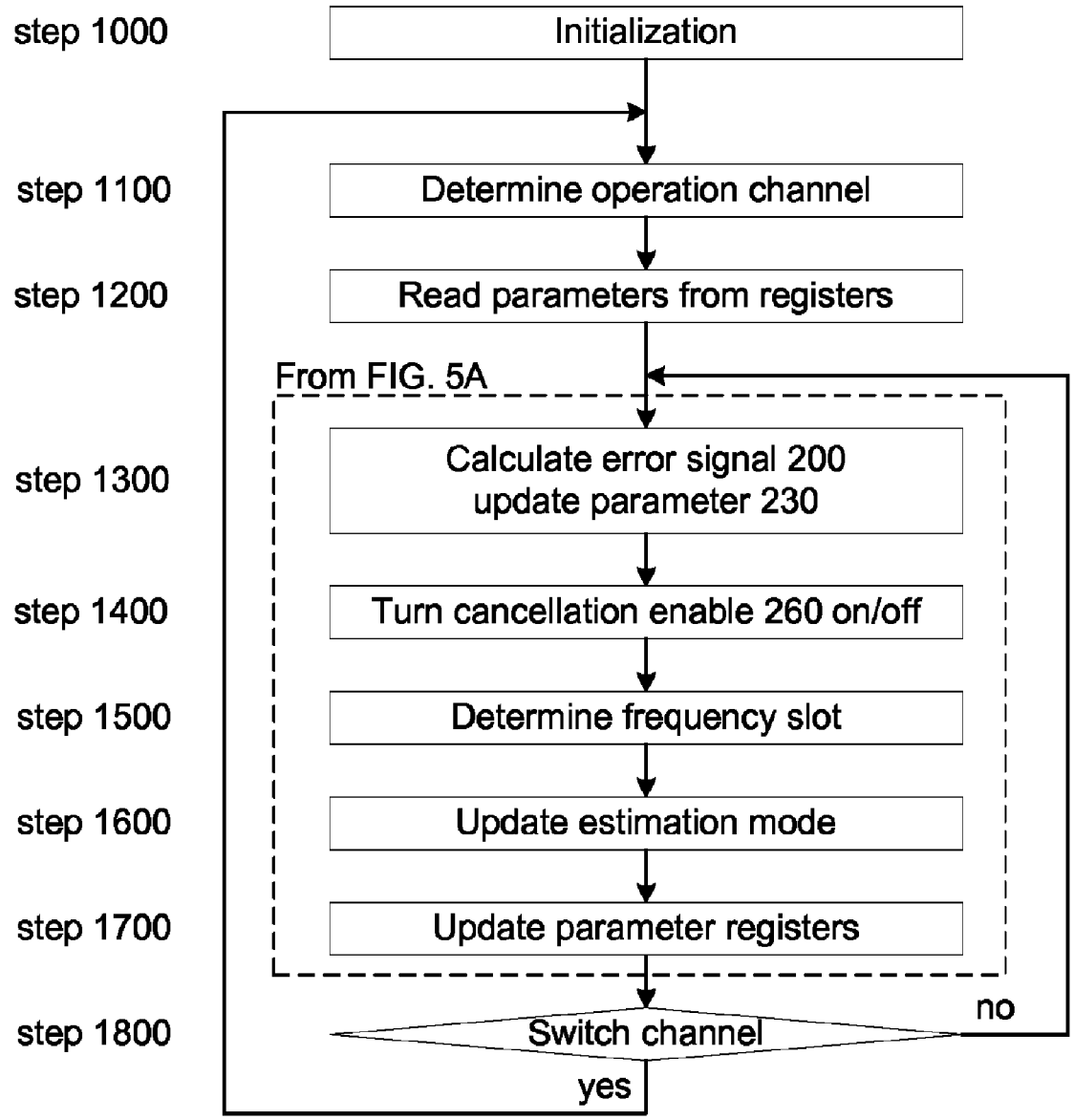
FIG. 6A is a flowchart depicting an exemplary method for using a harmonics canceller to attenuate harmonics spurs in multiple channels.

FIG. 6A is a flowchart depicting an exemplary method for using a harmonics canceller to attenuate harmonics spurs in multiple channels. According to the embodiment, a harmonics canceller is shared among a plurality of channels, each of which may be carrying a signal with a harmonics spur. Except for a few additional steps related to selecting a channel to process, including steps 1100, 1200, and 1800, the core process to seek out and attenuate a harmonics is similar to the process shown earlier in FIG. 5A.

Step 1000 involves initializing or resetting various components of harmonics canceller 100, including parameter estimator 220 and various registers and latches. Step 1100 involves determining a channel upon which to process. The channel selected may be selected from a group of channels according to a pre-determined pattern.

Step 1200 involves retrieving parameters and restoring states associated with the harmonics canceller for a channel. Steps 1300-1700 involve the core process of seeking out and attenuating a harmonics spur in an incoming channel, similar to the steps described in the embodiment described with FIG. 5A. The core process involves calculating error signals, updating estimation parameters, turning cancellation enable on or off, determining frequency slot, specifying estimation mode, and updating parameter registers. Step 1800 involves deciding whether to switch the channel. After a predetermined number of samples have been processed, if a decision is made to switch, the process stores parameters and begins anew from step 1100. If the process is to stay with the current channel, the process begins anew from step 1300, where a new sample of input signal 145 is obtained.

Figure 6B:
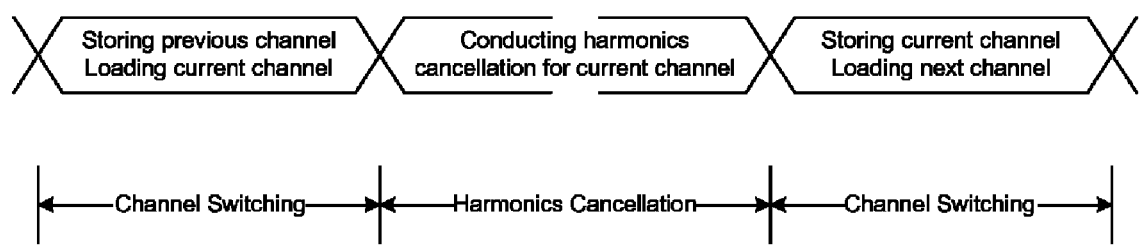
FIG. 6B illustrates an exemplary series of steps used for switching the channel for a shared harmonics canceller to process.

FIG. 6B illustrates an exemplary series of steps used for switching the channel for a shared harmonics canceller to process. According to an embodiment, in switching to a different channel to process, a harmonics canceller first stores information including states stored in various registers and latches for a previous channel before loading information to initialize or restore the states of a harmonics canceller for a current channel. By storing the information into external memory, the implementation complexity and hence hardware cost may be reduced. After the harmonics canceller is re-initialized with the retrieved information, the harmonics canceller performs harmonics cancellation for the current channel. In switching to a next channel to operate, the harmonics canceller will store the states for the current channel and load the states for the next channel, and the process continues.

Figure 6C:
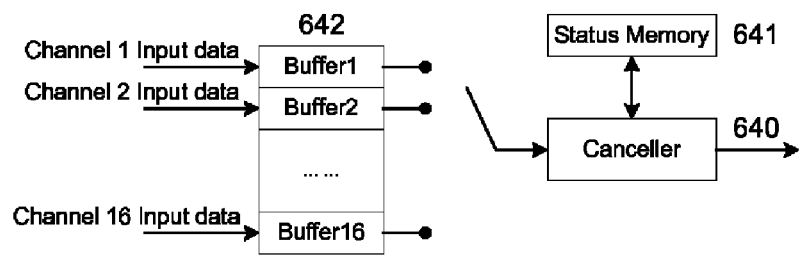
FIG. 6C shows an embodiment of a shared harmonics canceller system adapted to store and restore various state of a shared harmonics canceller using a separate buffer storage.

FIG. 6C shows an embodiment of a shared harmonics canceller system adapted to store and restore various state of a shared harmonics canceller using a separate buffer. According to an embodiment, when the number of incoming input data of a channel in buffer 642 reaches a predetermined threshold, this channel may be selected for processing. When a specific channel is selected for a harmonics canceller 640 to operate, recorded state is retrieved from the status memory 641 to initialize or re-initialize the harmonics canceller 640. The information retrieved may include prior estimated parameters for a channel, including the amplitude, frequency, and phase of a prior estimated artificial signal. Samples of the incoming signal are then obtained from a buffer adapted to store and buffer incoming signals for the channel. Upon deciding to switch to a different channel for processing, the harmonics canceller updates the estimated parameters and records updated information to the status memory 641 so the information can be restored back to the harmonics canceller when the time comes to process the same channel again.

Figure 6D:
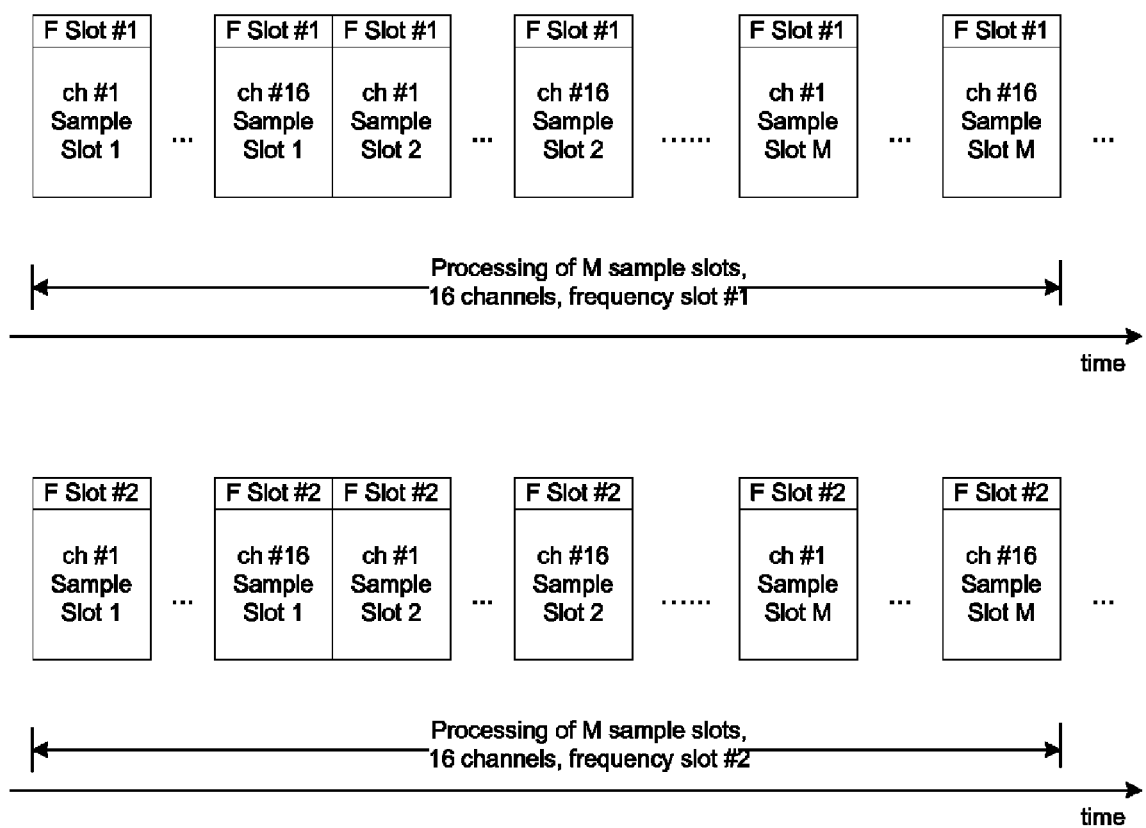
FIG. 6D illustrates an exemplary procedure for sampling and processing signals of multiple channels over multiple frequency slots.

FIG. 6D illustrates an exemplary process for sampling and processing signals for multiple channels over two frequency slots. The process begins with obtaining a first sample slot for a first channel for processing, where each sample slot contains a predetermined number of samples. According to an embodiment, each sample slot includes approximately 10 samples. The process repeats for each of the channels. Then a second sample slot is obtained for each of the channels for processing. If no spur is found, the process can repeat until a predetermined number of sample slots have been taken for each of channel, at which time the harmonics canceller moves on to processing for a second frequency slot.

For the second frequency slot, the process proceeds in a similar way to that for the first frequency slot. A first sample slot for each of the channels is obtained for a first round of processing. A second sample slot for each of the channels is obtained for a second round of processing. For each channel, if no spur is found, the process can repeat for a predetermined number of sample slots before the process moves on to processing for a next frequency slot. For each channel, the process repeats until a harmonics spur is found for the channel. According to an embodiment, the procedure may repeat until all the frequency slots are scanned.

Figure 7:
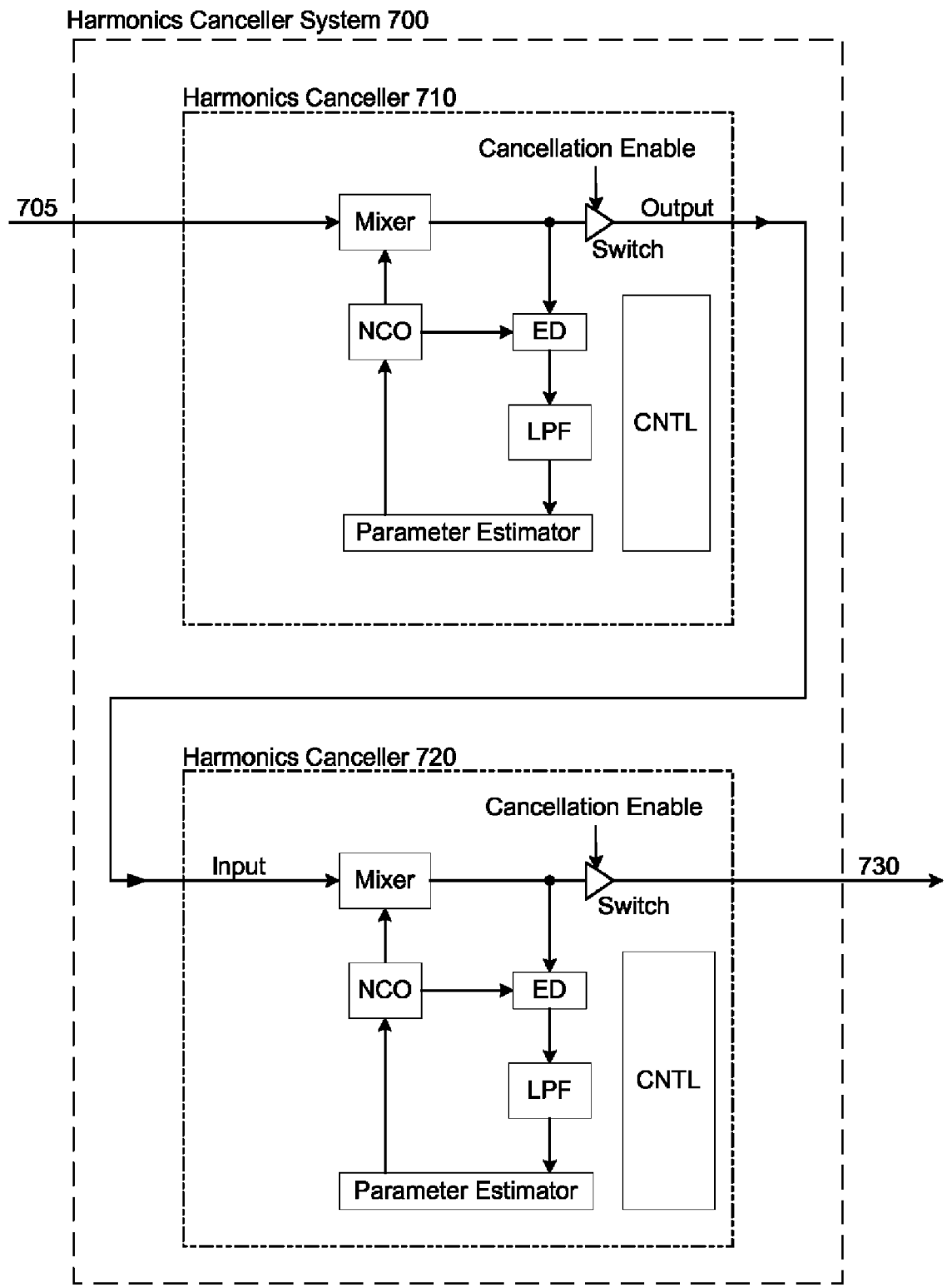
FIG. 7 illustrates an exemplary embodiment adapted to attenuate two harmonics spurs in an incoming signal.

FIG. 7 illustrates an embodiment adapted to attenuate two harmonics spurs in an incoming signal. According to an embodiment, two harmonics cancellers may be cascaded in series with each other. The incoming signal enters the harmonics canceller system 700 at system input 705. A first harmonics remover 710 is adapted to lock onto and attenuate a first harmonics spur. After the first harmonics canceller 710 successfully locks into and attenuates the first harmonics spur, the output from the first harmonics canceller is fed into a second estimation canceller 720 where, according to the embodiment, the second estimation is adapted to lock into and attenuate a second harmonics spur. After the second harmonics canceller locks into and cancels the second harmonics spur, the output from the second harmonics canceller is routed to the system output 730 of the harmonics canceller system 700. According to the embodiment, the output from the second harmonics canceller preferably presents the incoming signal with two harmonics spurs removed.

In conclusion, the present invention provides various embodiments of methods and systems for removing harmonics spurs in digital electronics systems. While these inventions have been described in the context of the above specific embodiments, modifications and variations are possible. Accordingly, the scope and breadth of the present invention should not be limited by the specific embodiments described above and should instead be determined by the following claims and their full extend of equivalents.

What is claimed is:

1. A continuous wave remover for attenuating a harmonics spur in an input digital signal, the wave remover comprising:
   an artificial signal generator configured to create an artificial signal based on a parameter estimation signal;
   a signal mixer configured to combine the input digital signal and the artificial signal to produce a mixed signal;
   an error detector configured to process the mixed signal and the artificial signal to produce a first error signal;
   a low-pass filter configured to process the first error signal to produce a second error signal;
   a frequency slot scanner configured to select a current frequency slot from a frequency range; and
   a parameter estimator configured to process the second error signal to produce the parameter estimation signal.

2. The continuous wave remover of claim 1 wherein the parameter estimation signal includes a phase estimation parameter, a frequency estimation parameter, and an amplitude estimation parameter for the artificial signal.

3. The continuous wave remover of claim 2 further comprising mode selection circuitry configured to specify an acquisition mode based on a first threshold and to specify a tracking mode based on a second threshold.

4. The continuous wave remover of claim 3 where the first threshold and the second threshold are the same.

5. The continuous wave remover of claim 3 wherein the mode selection circuitry is configured to specify the acquisition mode if the amplitude estimation parameter falls below the first threshold and to specify the tracking mode if the amplitude estimation parameter rises above the second threshold.

6. The continuous wave remover of claim 3 further comprising a memory module for storing and retrieving a plurality of amplitude estimation parameters, wherein the mode selection circuitry is configured to specify the acquisition mode if the amplitude estimation parameter and the plurality of amplitude estimation parameters do not converge within the first threshold and to specify the tracking mode if the amplitude estimation and the plurality of amplitude estimation parameters converge within the second threshold.

7. The continuous wave remover of claim 3 adapted to produce the mixed signal at an output as the input digital signal with the harmonics spur attenuated.

8. The continuous wave remover of claim 7 adapted to obtain a plurality of sample slots from the input digital signal, each of the plurality sample slot including a plurality of samples.

9. The continuous wave remover of claim 8 wherein each of the plurality of sample slots comprises about 10 samples.

10. The continuous wave remover of claim 8 wherein the continuous wave remover is associated with a state that can be stored and retrieved for each of the plurality of sample slots.

11. The continuous wave remover of claim 10 wherein the state comprises information relating to:
    the phase estimation parameter;
    the frequency estimation parameter;
    the amplitude estimation parameter;
    the current frequency slot; and
    whether the tracking mode or the acquisition mode is specified.

12. The continuous wave remover of claim 10 adapted to process a plurality of incoming signals, the plurality of incoming signals including a first incoming signal and a second incoming signal, the continuous wave remover further comprising:
    an input memory component configured to store the plurality of incoming signals;
    a parameter memory component configured to store a history of the state of the continuous wave remover;
    a channel selector configured to select the first incoming signal for processing; and
    a channel selector configured to select the second incoming signal for processing.

13. The continuous wave remover of claim 10 configured to store the state of the continuous wave remover to the parameter memory component.

14. The continuous wave remover of claim 10 configured to initiate the state of the continuous wave remover based on information stored in the parameter memory component.

15. A system adapted to attenuate a plurality of harmonics spurs in an incoming digital signal, the plurality of harmonics spurs including a first harmonics spur and a second harmonics spur, the system comprising a first continuous wave remover of claim 10 and a second continuous wave remover of claim 10, wherein:

the incoming digital signal is passed to the first continuous wave remover as the input digital signal for the first continuous wave remover;

the incoming digital signal is passed to the second continuous wave remover through one or more continuous wave removers, the one or more continuous wave removers including the first continuous wave remover, the signal through the one or more continuous wave removers passed to the second continuous wave remover as the input digital signal for the second continuous wave remover; and the output of the second wave remover is passed to a system output.

16. The system of claim 15 wherein the output of the first continuous wave remover is passed to the second continuous wave remover as the input digital signal for the second continuous wave remover.

17. The system of claim 15 wherein the output of the first continuous wave remover is passed through at least one other continuous wave remover before being passed to the second continuous wave remover as the input digital signal for the second continuous wave remover.

18. A system comprising the continuous wave remover of claim 10 adapted to attenuate a plurality of harmonics spurs in a plurality of incoming digital signals, the plurality of incoming digital signals including a first incoming signal and a second incoming signal, the system further comprising:

an input memory component configured to store the plurality of incoming digital signals;

a channel selector configured to select the first incoming signal and a second incoming signal; and a parameter memory component adapted to store a history of the state of the continuous wave remover;

wherein in switching from processing the first incoming signal to processing the second incoming signal, the system stores the state of the continuous wave remover to the parameter memory component and initiates the state of the continuous wave remover for processing the second incoming signal.

19. The continuous wave remover of claim 1 wherein the low-pass filter comprises a means for carrying out narrow-band low-pass filtering that is multiplier-free.

20. A method for attenuating a plurality of harmonics spurs in a plurality of incoming digital signals, the method comprising:

buffering the plurality of incoming digital signals;

selecting an incoming digital signal from the plurality of incoming digital signals;

initializing;

obtaining a sample slot for the incoming digital signal;

selecting a frequency slot;

processing the sample slot;

obtaining a plurality of estimation parameters for the sample slot, the plurality of estimation parameters including a phase estimation parameter, a frequency estimation parameter, and an amplitude estimation parameter; and storing the plurality of estimation parameters and the frequency slot.

21. The method of claim 20 wherein the step of initializing includes retrieving a plurality of previously stored estimation parameters and retrieving a previously stored prior frequency slot.

22. The method of claim 20 wherein the step of initializing includes creating a plurality of fresh parameters.

23. A method for attenuating a plurality of harmonics spurs in an incoming digital signal, the method comprising:

selecting an incoming sample slot from the incoming digital signal;

initializing a plurality of continuous wave removers, each of the plurality of continuous wave removers configured to a harmonics spur, the plurality of continuous wave removers including a first continuous wave remover and a second continuous wave remover;

selecting a frequency slot;

using the first continuous wave remover to process the incoming sample slot to produce a first output;

processing the first output to obtain a second output;

sampling the second output to obtain an intermediary sample slot;

using the second continuous wave remover to process the intermediary sample slot to produce a third output; and outputting the third output as a signal with the plurality of harmonics spurs attenuated.

24. The method of claim 23 wherein the processing the first output to obtain the second output includes the passing of a signal from the first continuous wave remover to the second continuous wave remover.

25. The method of claim 23 wherein the processing of the first output to obtain the second output includes the processing of a signal from the first continuous wave remover using one or more of the plurality of continuous wave removers.

* * * * *